(12) United States Patent
O'Brien

(10) Patent No.: US 8,322,964 B2
(45) Date of Patent: Dec. 4, 2012

(54) LOAD HAULING ALL TERRAIN VEHICLE

(76) Inventor: George M. O'Brien, Acworth, GA (US)

( * ) Notice: Subject to any disclaimer, the term of this patent is extended or adjusted under 35 U.S.C. 154(b) by 0 days.

(21) Appl. No.: 12/728,344

(22) Filed: Mar. 22, 2010

(65) Prior Publication Data

US 2011/0229293 A1   Sep. 22, 2011

(51) Int. Cl.
*B60P 9/00* (2006.01)
(52) U.S. Cl. ......... 414/462; 414/486; 414/540; 414/642
(58) Field of Classification Search .............. 414/486, 414/540, 642, 462
See application file for complete search history.

(56) References Cited

U.S. PATENT DOCUMENTS

| | | | | |
|---|---|---|---|---|
| 2,375,233 A * | 5/1945 | Magee | ........................... | 172/829 |
| 3,762,584 A * | 10/1973 | Peterson | ........................... | 254/327 |
| 3,863,782 A | 2/1975 | Sandrock | | |
| 3,876,095 A * | 4/1975 | Stedt | ........................... | 414/487 |
| 3,945,517 A * | 3/1976 | Carley | ........................... | 414/559 |
| 4,398,581 A * | 8/1983 | Aikins et al. | ........................... | 144/366 |
| 5,028,198 A | 7/1991 | Buhr | | |
| 5,393,194 A | 2/1995 | Smith | | |
| 5,662,451 A | 9/1997 | Muzzi et al. | | |
| 5,975,831 A | 11/1999 | Martin | | |
| 6,138,991 A * | 10/2000 | Myers, Jr. | ........................... | 254/323 |
| 6,155,771 A | 12/2000 | Montz | | |
| 6,612,549 B1 | 9/2003 | Woods, Jr. | | |
| 6,705,680 B2 | 3/2004 | Bombardier | | |
| 7,156,246 B2 | 1/2007 | Sherrod | | |
| 7,438,153 B2 | 10/2008 | Kalsnes et al. | | |
| 7,549,545 B1 | 6/2009 | Ashmore | | |
| 2006/0237502 A1 | 10/2006 | Tweet et al. | | |
| 2006/0280584 A1 | 12/2006 | Spuzak et al. | | |
| 2007/0089929 A1 | 4/2007 | Schriewer | | |
| 2008/0038103 A1 | 2/2008 | Bell | | |
| 2008/0277958 A1 | 11/2008 | King et al. | | |
| 2009/0123260 A1 | 5/2009 | Howard-Leicester | | |
| 2010/0066152 A1 * | 3/2010 | King et al. | ........................... | 298/17.7 |

* cited by examiner

*Primary Examiner* — Saul Rodriguez
*Assistant Examiner* — Willie Berry, Jr.
(74) *Attorney, Agent, or Firm* — Sutherland Asbill & Brennan LLP

(57) ABSTRACT

The present application provides an all terrain vehicle for load hauling. The all terrain vehicle may include a cargo box and a winch assembly positioned about the cargo box.

15 Claims, 3 Drawing Sheets

LOAD HAULING ALL TERRAIN VEHICLE

TECHNICAL FIELD

The present application relates generally to All Terrain Vehicles and more particularly relates to a load hauling All Terrain Vehicle that provides for single person loading and transport of loads such as animal carcasses and the like from difficult terrain and/or remote locations.

BACKGROUND OF THE INVENTION

Hunting wildlife and the like generally requires the participation of at least two persons if the location of the hunt is remote and/or largely inaccessible by most vehicles. More specifically, at least two people generally are required in order to haul, for example, a deer carcass and the like out of the woods and to a vehicle or other type of transport. In fact, more than two people often may be required depending upon the size of the carcass or the number of carcasses. Even then, the hunters may be forced to drag the carcasses across the ground for some distance, possibly leading to damage to the carcasses and certainly requiring considerable effort by the hunters. As a result, certain types of remote locations may have limited possibilities for hunting, at least larger types of wildlife and the like.

The use of various types of All Terrain Vehicles had increased the territory that may be accessible by a vehicle. Even with the use of most All Terrain Vehicles, however, it may be difficult for a single hunter to attempt to load a carcass or other type of load onto the All Terrain Vehicle. Various types of wildlife hoist have been considered for use with All Terrain Vehicles. These wildlife hoists, however, generally simply suspend the carcass off of the ground. Such an arrangement may cause the All Terrain Vehicle as a whole to be somewhat unstable and also may damage the carcass or other load during transport.

There is therefore a desire for an improved load hauling All Terrain Vehicle and like. Such an improved All Terrain Vehicle preferably may allow a single person to acquire and transport a load such as a wildlife carcass without undue effort or damage to the carcass. The improved All Terrain Vehicle also should be easy to operate and should be stable during transport.

SUMMARY OF THE INVENTION

The present application thus provides an all terrain vehicle for load hauling. The all terrain vehicle may include a cargo box and a winch assembly positioned about the cargo box.

The all terrain vehicle further may include a roll bar such that the winch assembly may be attached to the roll bar. The winch assembly also may include a horizontal support attached to the roll bar and a support plate mounted on the horizontal support. The support plate may include a collar to be mounted on the horizontal support. The winch assembly may include one or more pins to secure the support plate to the horizontal support. A winch positioned on the support plate. The winch assembly may be a battery powered winch. The winch assembly may include a boom extending over the cargo box. The boom may have a hook and a tackle. The boom may telescope or pivot. The cargo box may include a tilting cargo box. The cargo box may include a cargo box door.

The present application further may provide for a method of transporting a load via an all terrain vehicle and the like. The method may include the steps of raising a cargo box of the all terrain vehicle, attaching the load to a cable of a winch assembly attached to the all terrain vehicle, retracting the cable of the winch assembly, raising the load over the raised cargo box, lowing the cargo box, and lowering the load into the cargo box.

The method further may include the steps of lowering a door of the cargo box before the step of raising the load over the cargo box, attaching the winch assembly to a roll bar of the all terrain vehicle, securing the load within the cargo box, and maneuvering a boom of the winch assembly about the load.

The present application further may provide an all terrain vehicle for load hauling. The all terrain vehicle may include a tilting cargo box and a winch assembly positioned about the tilting cargo box. The winch assembly may include a winch and a boom mounted onto a support plate such that the winch assembly is removable from the all terrain vehicle.

These and other features and improvements of the present application will become apparent to one of ordinary skill in the art upon review of the following detailed description when taken in conjunction with the several drawings and the appended claims.

DETAILED DESCRIPTION

Figure 1:
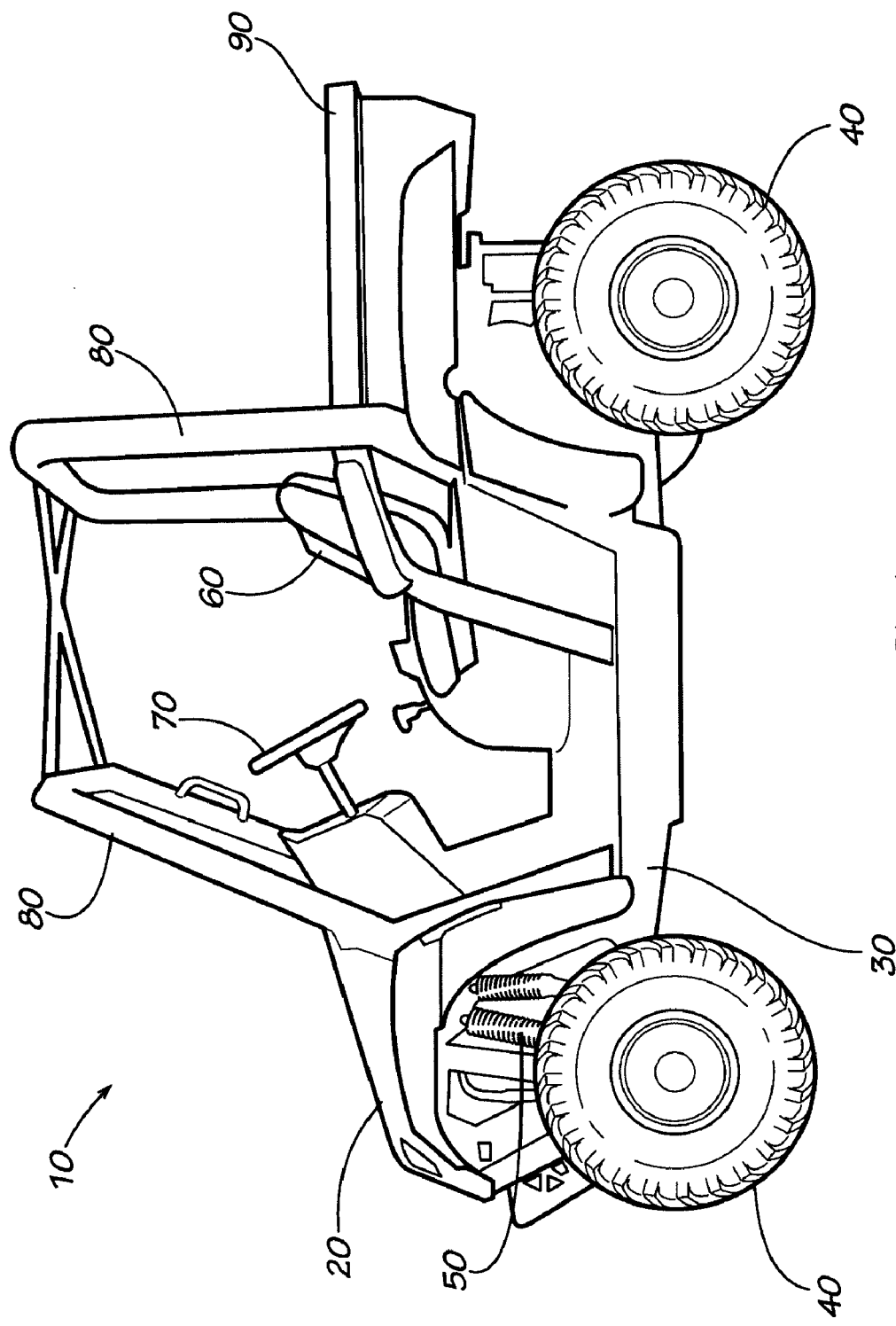
FIG. 1 is a perspective view of a known All Terrain Vehicle.

Referring now to the drawings, in which like numerals refer to like elements throughout the several views, FIG. 1 shows a known All Terrain Vehicle ("ATV") 10. Generally described, the ATV 10 may include a body 20 positioned on a frame 30. The ATV 10 further may include a number of wheels 40 with an associated suspension system 50 and a number of passenger seats 60 positioned about a steering wheel 70. The passenger seats 60 and the passenger compartment in general may be surrounded by a number of roll bars 80. The ATV 10 further may include a cargo box 90 positioned behind the passenger seat 60 or otherwise. The cargo box 90 may be pivotable so as to dump the contents therein. The ATV 10 may be equipped two-wheel drive or four-wheel drive and may be designed for recreational, utility, or other type of use or combinations thereof.

An example of the ATV 10 may be offered by Arctic Cat, Inc. of Thief River Falls, Minn. under the trademark "PROWLER®". Many other designs, configurations, and manufacturers, however, may be used herein. Suitable ATV's also may be offered by Polaris, Kubota, Ranger, Kawasaki, and others. Likewise, other types of vehicles may be used herein. The ATV 10 or other type of vehicle preferably includes the use of the roll bars 80 and the cargo box 90.

Figure 2:
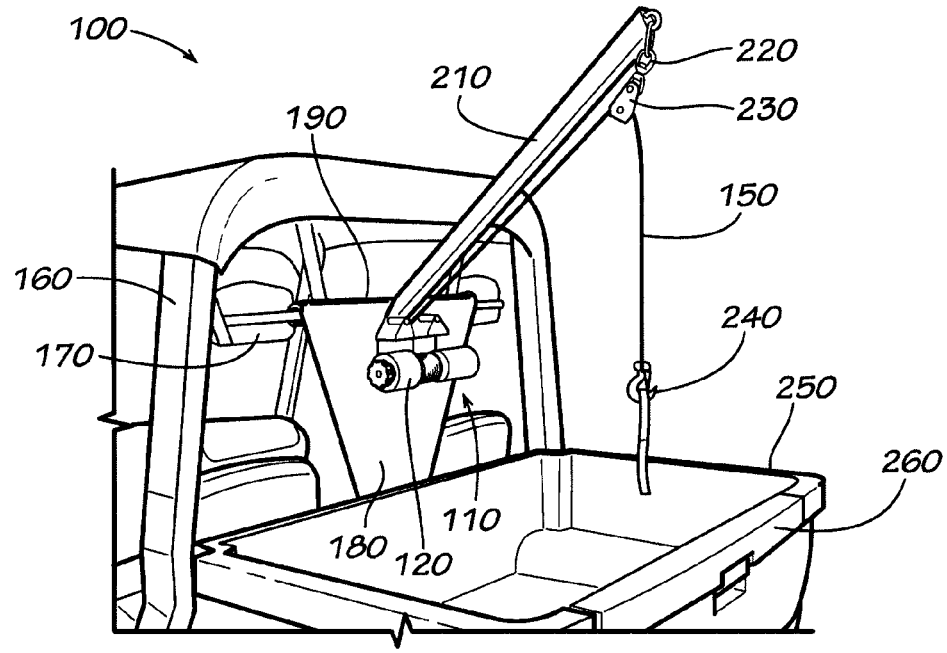
FIG. 2 is a perspective view of an All Terrain Vehicle with the winch assembly as is described herein.
Figure 3:
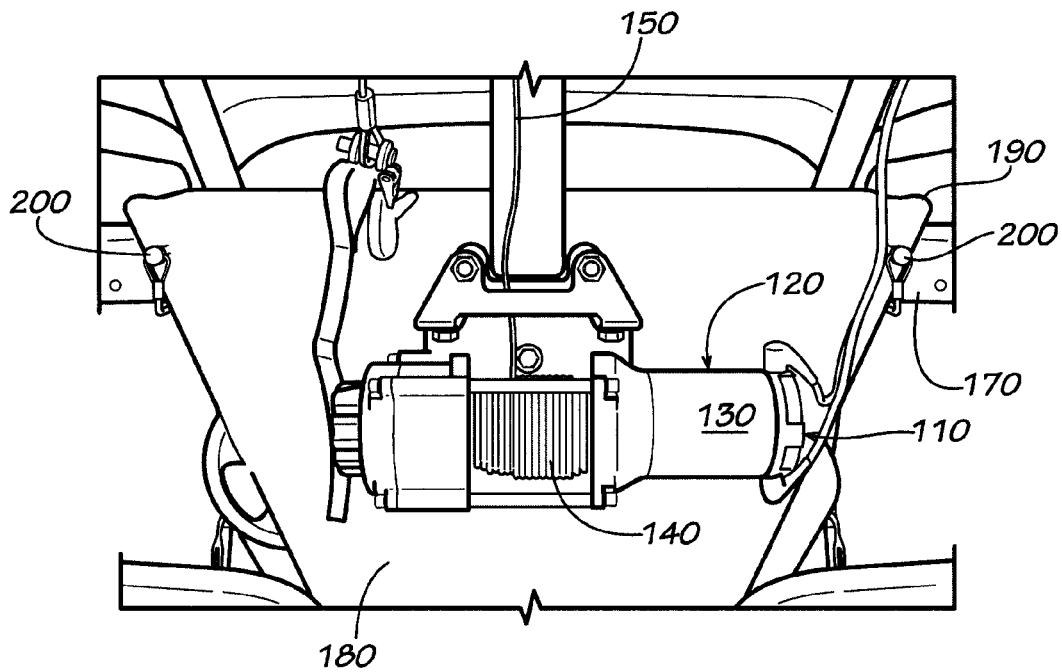
FIG. 3 is a plan view of the winch assembly of the All Terrain Vehicle of FIG. 2.

FIG. 2 shows an All Terrain Vehicle ("ATV") 100 as is described herein. Generally described, the ATV 100 may be similar to the ATV 10 described above and with the addition of a winch assembly 110 as is shown in FIG. 3. The winch assembly 110 generally includes a winch 120. The winch 120 may be battery powered, gas powered, or otherwise. A battery powered winch may be powered by the battery of the ATV 100 or otherwise. The winch 120 may include a drive motor 130 and a spool 140 and may be of conventional design. A length of cable 150 may be mounted onto the spool 140. The cable 150 may be metal cable and the like. In this example, the winch 120 may pull loads of about 2000 pounds or so (about 907 kilograms). Other types of winches 120 and loads may be used herein. Multiple winch assemblies 110 or multiple winches 120 also may be used herein.

The winch assembly 110 may be mounted on a number of roll bars 160. The roll bars 160 may be similar to the roll bars 80 described above and may protect the passenger seat 60 and the passenger compartment as a whole from roll over. The roll bars 160 typically are made out of metal tubing and the like. The roll bars 160 may be original equipment on the ATV 100 or the roll bars 160 may be retrofitted thereon. Other types of support structures and/or other types of protection means also may be used herein.

The winch assembly 110 may include a horizontal support 170. The horizontal support 170 may extend substantially horizontally from the roll bar 160 on one side of the passenger compartment to the roll bar 160 on the other side. The horizontal support 170 may be made out of metal tubing and the like. The horizontal support 170 may be welded and/or otherwise attached to the roll bars 160. The horizontal support 170 also may be attached by pins, clamps, and similar means.

The winch assembly 110 further may include a support plate 180. The support plate 180 preferably may be made out of metal plate and the like. The support plate 180 may include an upper collar 190. The upper collar 190 may be sized so as to be positioned over the horizontal support 170 and mounted thereon. A number of pins 200 may extend through the support plate 180 and the horizontal support 170 so as to secure the support plate 180 on the horizontal support 170. Other types of attachment means may be used herein. The winch 120 likewise may be bolted into place onto the support plate 180 or otherwise attached thereto. The support plate 180 with the wench 120 thereon thus may be positioned on and removed from the ATV 100 as desired. Other types of attachment means may be used herein.

The winch assembly 110 further may include a boom 210. The boom 210 may be mounted onto the support plate 180 and/or the horizontal support 170. The boom 210 may extend upwardly and outwardly from the support plate 180. The boom 210 may be made out of metal tubing and the like. The boom 210 may be as single element of a fixed length or the boom 210 may have multiple elements so as to telescope in length. For example, multiple pins and holes may be used within the boom so as to provide the telescoping length. The boom 210 also may pivot about the support plate 180 over a range of motion so as to extend outside of the ATV 100 via a pin and boss and otherwise. The boom 210 may be motorized so as to extend outwardly and/or to pivot.

The boom 210 may include a tackle 220 at one end thereof with a roller 230 to support the cable 150 of the winch 120. The cable 150 may end in a hook 240 or other type of attachment device. Other types of devices to support the cable 150 also may be used herein.

As is shown, the boom 210 may extend over a cargo box 250. The cargo box 250 may be similar to the cargo box 90 described above. The cargo box 250 may include a cargo door 260 on one end thereof. The cargo door 260 may be raised and lowered as desired. The cargo box 250 as a whole may pivot about the rear end of the ATV 100 so as to dump the contents of the cargo box 250 or to assist in loading as will be described in more detail below. Other types of pivoting or rotating designs may be used herein.

In use, the ATV 100 may be driven off road or through any type of terrain to the desired location of the hunt or other location. A load 270 may be attached to the ATV 100 and transported or otherwise maneuvered out of the location. Although the load 270 is shown here in FIG. 4 as being a tree stump, the load 270 may be any type of load, including an animal carcass and the like. Multiple loads 270 also may be used herein.

Figure 4:
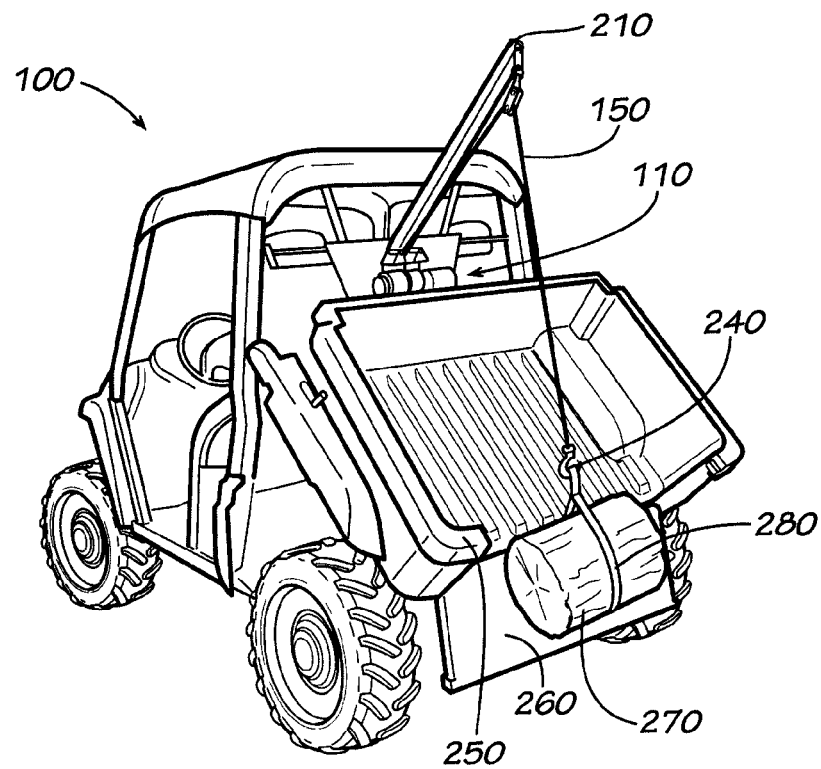
FIG. 4 is a perspective view of the All Terrain Vehicle of FIG. 2 with the cargo box raised.

A harness 280, other type of strap, other type of attachment devices, and the like, may be positioned about the load 270 as may be needed. The cable 150 from the winch 120 may be paid out such that the hook 240 may be attached to the harness 280. In order to ease retracting the load 270 into the cargo box 250 and also to prevent damage to the load 270, the cargo box 250 may be pivoted open with the cargo 260 door extended as is shown in FIG. 4. The winch 120 then may be activated such that the drive motor 130 rotates the spool 140 so as to retract the cable 150 and pull the load 270 into the cargo box 250. Once the load is in place, the cargo box 250 may be rotated back into place and secured. The load 270 also may be secured therein via ropes, bungee cords, tarps, and any other convenient device. The ATV 100 thus may then transport the load 270 as desired.

Figure 5:
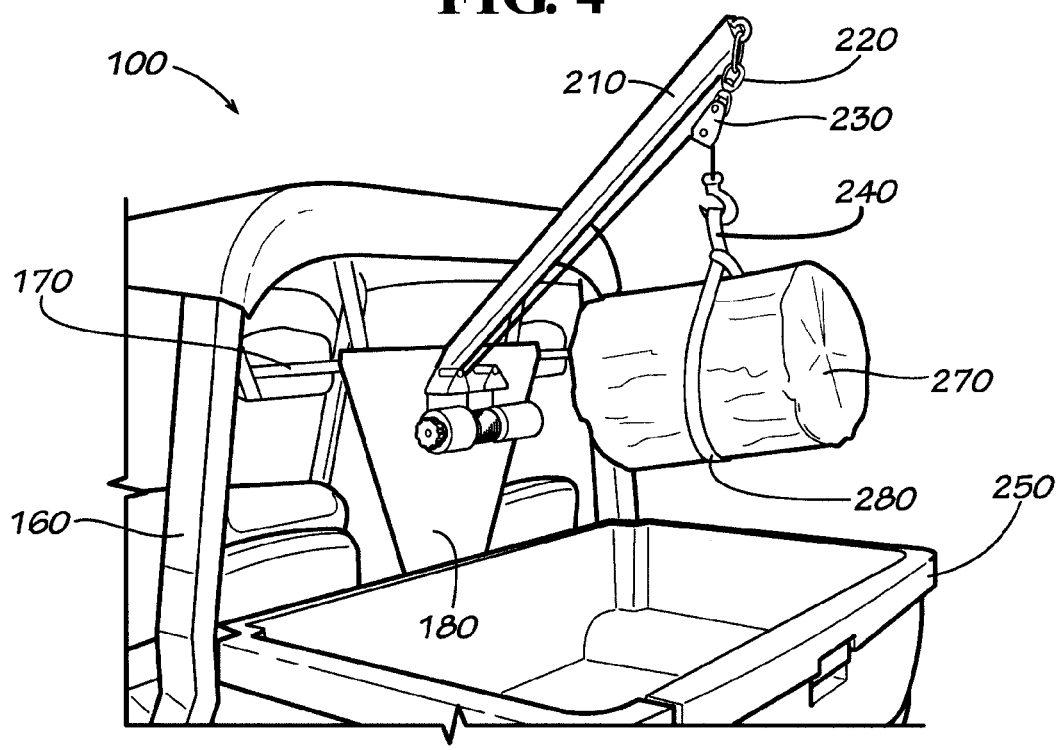
FIG. 5 is a perspective view of the All Terrain Vehicle of FIG. 2 with the load raised therein.

As is shown in FIG. 5, the wench assembly 110 also may lift the load 270 above the cargo box 250. This positioning would allow, for example, an animal carcass to be dressed or for other types of work to be performed on the load 270. The carcass or other type of load 270 then may be returned to the cargo box 250 for transport. The boom 210 of the wench assembly 110 may extend beyond the cargo box 250 and/or the boom 210 may rotate such that the load 270 may be positioned outside of or above the cargo box 250.

The All Terrain Vehicle 100 thus permits ease of positioning the load 270 therein through the combination of the winch assembly 110 and the cargo box 250. Moreover, the combination of the winch assembly 110 and the cargo box 250 largely prevents damage to the load 270 during transport. The use of the winch assembly 110 and the cargo box 250 also allows for single person operation while providing a secure means to transport the load 270. The All Terrain Vehicle 100 thus provides for easy load hauling and improved access to and transport from remote locations and/or difficult terrain.

It should be apparent that the foregoing relates only to certain embodiments of the present application and that numerous changes and modifications may be made herein by one of ordinary skill in the art without departing from the general spirit and scope of the invention as defined by the following claims and the equivalents thereof.

I claim:

1. An all terrain vehicle for hauling a load, comprising:
   a cargo box positioned about a pair of rear tires of the all terrain vehicle;
   wherein the cargo box comprises a first end and a second end and wherein the cargo box pivots about the second end;
   a winch assembly positioned about the cargo box so as to position the load in the cargo box;
   the winch assembly comprising a support plate with a collar mounted on a horizontal support; and
   a roll bar;
   wherein the winch assembly is attached to the roll bar.

2. The all terrain vehicle of claim 1, wherein the winch assembly comprises one or more pins securing the support plate to the horizontal support.

3. The all terrain vehicle of claim 1, wherein the winch assembly comprises a winch positioned on the support plate.

4. The all terrain vehicle of claim 1, wherein the winch assembly comprises a boom extending over the cargo box.

5. The all terrain vehicle of claim 4, wherein the boom comprises a telescoping boom.

6. The all terrain vehicle of claim 4, wherein the boom comprises a pivoting boom.

7. The all terrain vehicle of claim 1, wherein the cargo box comprises a tilting cargo box.

8. The all terrain vehicle of claim 7, wherein the cargo box comprises a cargo box door.

9. The all terrain vehicle of claim 1, wherein the winch assembly comprises a battery powered winch.

10. The all terrain vehicle of claim 1, wherein the winch assembly comprises a hook and a tackle.

11. A method of transporting a load via an all terrain vehicle, comprising:
   attaching a winch assembly solely to a roll bar of the all terrain vehicle by a collar;
   raising a cargo box of the all terrain vehicle;
   attaching the load to a cable of the winch assembly;
   retracting the cable of the winch assembly;
   raising the load over the raised cargo box;
   lowing the cargo box; and
   lowering the load into the cargo box.

12. The method of claim 11, further comprising the step of lowering a door of the cargo box before the step of raising the load over the cargo box.

13. The method of claim 11, further comprising the step of securing the load within the cargo box.

14. The method of claim 11, further comprising the step of maneuvering a boom of the winch assembly about the load.

15. An all terrain vehicle for load hauling, comprising:
   a tilting cargo box with a cargo box door; and
   a winch assembly positioned about the tilting cargo box;
   wherein the winch assembly comprises a winch and a boom mounted onto a support plate such that the winch assembly is removable from the all terrain vehicle via one or more pins extending through a collar of the support plate.

* * * * *